United States Patent
Sears et al.

[11] Patent Number: 5,696,813
[45] Date of Patent: Dec. 9, 1997

[54] TELEPHONE SET

[75] Inventors: Duncan Andrew Sears, Hertfordshire, United Kingdom; Maria Josephine O'Toole, Dublin, Northern Ireland

[73] Assignee: SDX Business Systems Unlimited, Welwyn Garden, United Kingdom

[21] Appl. No.: 342,429

[22] Filed: Nov. 18, 1994

[30] Foreign Application Priority Data

Nov. 19, 1993 [GB] United Kingdom ............... 9323876

[51] Int. Cl.$^6$ ........................................... H04M 11/00
[52] U.S. Cl. ..................................... 379/93; 379/96
[58] Field of Search ........................... 379/96, 93, 94, 379/97, 98, 90, 110

[56] References Cited

U.S. PATENT DOCUMENTS

| | | |
|---|---|---|
| 4,656,654 | 4/1987 | Dumas . |
| 4,860,342 | 8/1989 | Danner . |
| 4,864,601 | 9/1989 | Berry . |
| 5,036,513 | 7/1991 | Greenblatt . |
| 5,283,638 | 2/1994 | Engberg et al. ............ 379/96 |
| 5,343,516 | 8/1994 | Callele et al. ............ 379/98 |
| 5,369,687 | 11/1994 | Farkas ...................... 379/98 |
| 5,500,893 | 3/1996 | Onosaka ................... 379/93 |

FOREIGN PATENT DOCUMENTS

| | | |
|---|---|---|
| 0339212 | 3/1989 | European Pat. Off. . |
| 8802206 | 9/1987 | WIPO . |
| 9107839 | 11/1990 | WIPO . |
| 9305606 | 9/1992 | WIPO . |

*Primary Examiner*—Stella Woo
*Attorney, Agent, or Firm*—Price, Gess & Ubell

[57] ABSTRACT

A telephone set (1) has an analogue telephone port (2) for connection to an analogue telephone network, and a controller (13,21) for generating routing control signals at the telephone port compatible with the telephone network and being responsive to input signals to control operation of the telephone set. A power supply port (19) is connected to the controller (13,21) and to a power source. A serial interface (37) connects the controller to a processor (8), whereby the control means is responsive to input signals supplied via the serial interface (31,7) to control operation of the telephone set. The telephone network is isolated from each of the serial interface (31,7) and the power supply port (19) while permitting data transfer between the telephone network and the control means.

13 Claims, 3 Drawing Sheets

TELEPHONE SET

FIELD OF THE INVENTION

The invention relates to a telephone set and telephone apparatus incorporating such a telephone set.

DESCRIPTION OF THE PRIOR ART

A conventional telephone set has a base and handset and is connected directly into a public switched telephone network (PSTN). These telephone sets are often referred to as POTS (plain old telephone set). The conventional telephone set can provide a number of functions such as hands free operation but is fairly limited in its ability to provide a variety of services to a user. To achieve enhanced services, proprietary telephones have been developed which generate special, proprietary control signals at their outputs which are fed to proprietary switches which can then respond as required. The problem with proprietary telephones is that they can only be used with the corresponding proprietary switches.

Several proposals have been made in the past for implementing telephone apparatus using a processor such as a personal computer (PC). An example is described in U.S. Pat. No. 5,065,425 while other examples are described in EP-A-0238255, EP-A-0535562 and EP-A-0451523. All these proposals, however, rely on proprietary digital techniques with digital telephone sets being connected to digital telephone networks. They are not suitable for use with conventional analogue telephone networks which are the most widely available.

SUMMARY OF THE INVENTION

In accordance with the present invention, a telephone set has an analogue telephone port for connection to an analogue telephone network, control means for generating routing control signals at the telephone port compatible with the telephone network and being responsive to input signals to control operation of the telephone set, a power supply port connected to the control means and for connection to a power source, a serial interface for connecting the control means to a processor, whereby the control means is responsive to input signals supplied via the serial interface to control operation of the telephone set, and means for electrically isolating the telephone network from each of the serial interface and the power supply port while permitting data transfer between the telephone network and the control means.

We have devised a new telephone set which can be used with an analogue telephone network such as a conventional public switched telephone network but which is capable of being connected also to a separate processor so that the telephone facilities can be controlled from the processor. This is achieved by providing the telephone set with a serial interface for connection to the processor and by providing means for electrically isolating the telephone network from each of the serial interface and the power supply port. This isolation is very important so as to avoid voltage surges and the like being inadvertently communicated between the telephone network and the processor. For example, it is important to protect the PC from hazardous voltages on the telephone line due to lightening. Also, the telephone line must be protected from voltage surges from the power source. This overcomes one of the major problems in attempting to achieve processor control of a telephone linked to an analogue telephone network.

The isolating means can be provided by a variety of devices but typically include one or more of an opto-electronic isolator and an isolating transformer.

Typically, the control means comprises a telephone controller connected to the analogue telephone port, the telephone controller responding to input signals to carry out normal telephone set operations.

By normal telephone set operations we include such operations as causing the telephone set to go off hook, detecting ringing at the telephone port, sounding an internal ringer in the telephone set, controlling hands free operation, muting transmission to the telephone network, storing a number of speed dial numbers, dial tone detection, volume control, and DTMF generation.

Preferably, the telephone set further comprises manually operable input means to enable a user to manually generate input signals, the input means being connected to the control means, whereby the control means is responsive to input signals both from the serial interface and the input means. The manually operable input means can be a key pad or other input device and typically, where a telephone controller is provided, the telephone controller is connected directly to the input means and is operable in response to power derived solely from the telephone network when responding to input signals from the input means.

The advantage of this arrangement is that the telephone set can be used in a conventional manner without requiring an external power supply, if it is not connected to a processor, since the functions performed by the telephone controller can all be powered by power supplied from the telephone network.

The presence of a control means within a telephone set leads to the possibility of further functions being performed by the telephone set. For example, the control means may further comprise speech processing means for processing speech signals received from the telephone network into a form suitable for storage. For example, the speech processing means may perform a compression algorithm on the speech signals. The storage of speech enables an answering machine capability to be provided and also a dictation facility. Thus, the user can use the telephone set like a dictating machine with his speech being stored for later replay.

In some examples, the control means may further comprise a fax processing means connected to the analogue telephone port for transmitting and receiving fax data and/or a data modem connected to the analogue telephone port for transmitting and receiving data defining signals.

Typically, the telephone set will generate standard DTMF tones or LD signals at its output port.

Typically, the serial interface will comprise an RS232 link.

We also provide, in accordance with the invention, telephone apparatus comprising a telephone set according to the first aspect of the invention, and a separate processor connected to the telephone set via the serial interface, the processor being adapted to generate said input signals for controlling operation of the control means.

In the simplest example, the processor is adapted to generate control signals for causing the telephone set to go on and off hook respectively.

Preferably, the processor is also adapted to generate control signals defining routing information. In this way, the user can dial a remote telephone by using the processor.

Typically, the telephone set will include a speaker and be operable in a hands free mode. In this case, a user could operate the telephone set via the processor and carry out other operations on the processor, for example word processing and the like, while conducting a telephone conversation with the telephone set in hands free mode.

In a further option, the telephone set has a variable volume speaker, the processor being adapted to generate control signals which can vary the volume of the speaker.

The telephone apparatus so far described can operate in a stand-alone fashion but in the preferred application, at least two telephone apparatus according to the invention are linked together by a network connecting the respective processors. This application considerably increases the flexibility of the overall system and where for example speech can be stored, enables speech stored on one processor to be accessed via the network by another processor. This has application within the office for handling dictation and the like.

BRIEF DESCRIPTION OF THE DRAWINGS

Some examples of a telephone set telephone apparatus according to this invention will now be described with reference to the accompanying drawings, in which.

DETAILED DESCRIPTION OF THE EMBODIMENT

Figure 1:
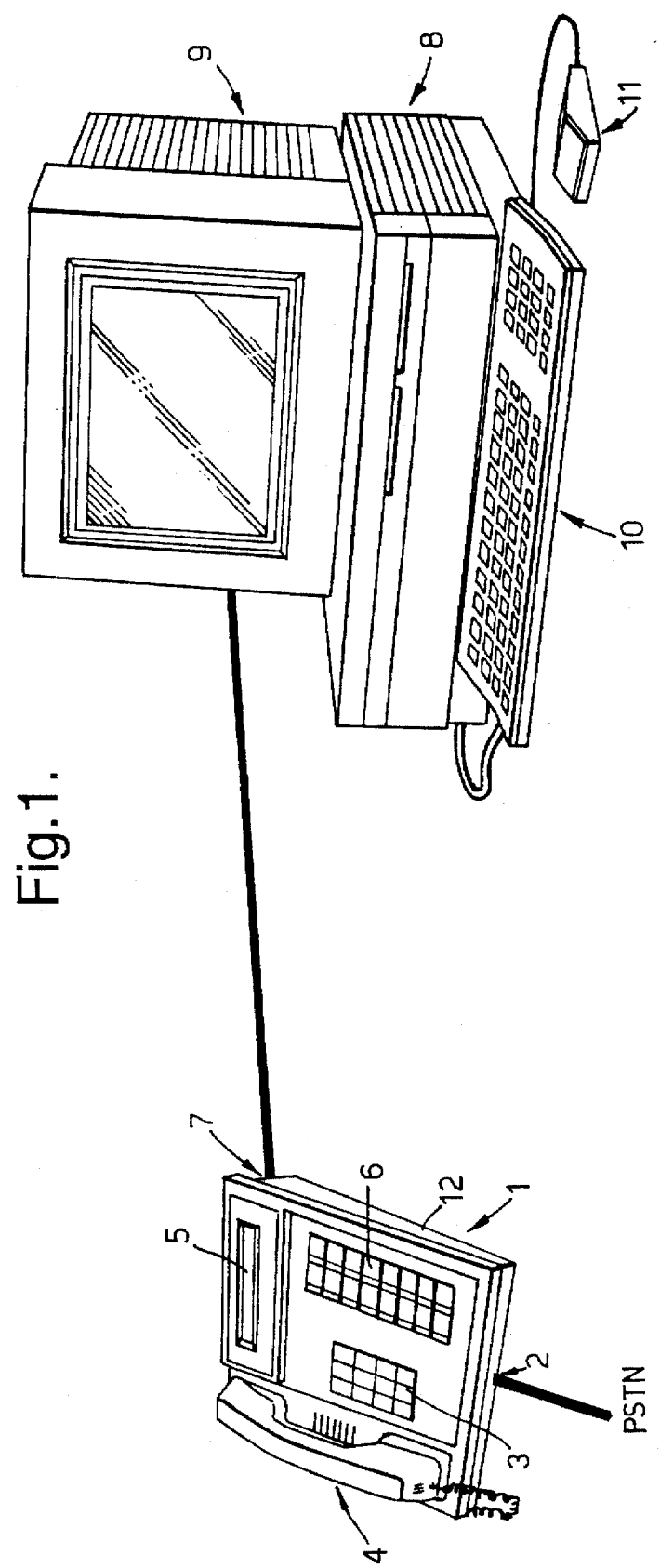
FIG 1 is a schematic, perspective view of one example of the apparatus.

The apparatus shown in FIG. 1 comprises a telephone set 1 having a port 2 which is connected to the analogue public switched telephone network (PSTN). Signals are transferred to and from the telephone set 1 via the port 2 using DTMF or LD tones. The telephone set 1 has a key pad 3 including function keys 6, a handset 4, and a display 5. The telephone set 1 is connected via a serial port 7, such as an RS232 link, to a personal computer (PC) of conventional form 8. The PC 8 is connected to a monitor display 9, a keyboard 10, and a mouse 11.

Figure 2:
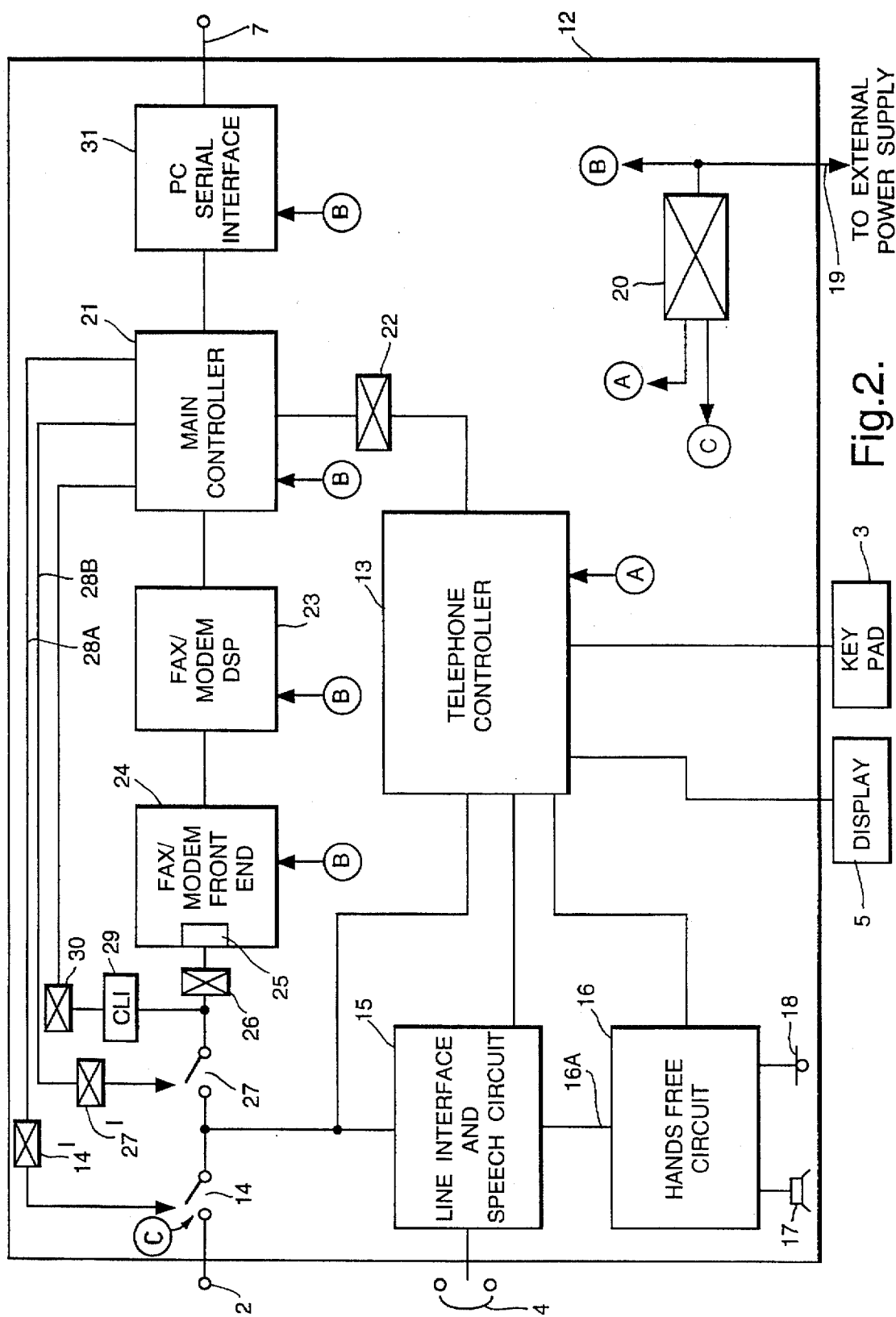
FIG. 2 is a block diagram of the main components of the telephone set shown in FIG. 1; and, FIG. 3 is a schematic, perspective view of a second example of sets of apparatus connected by a local area network.

The internal construction of the telephone set 1 is shown in more detail in FIG. 2. The housing of the telephone set is indicated schematically at 12 and mounted within the housing are a number of circuits indicated in block diagram form in FIG. 2. The port 2 is connected to a telephone controller chip 13 via a normally closed relay 14. In addition, the port 2 is connected to a line interface and speech circuit 15 (via the relay 14). The circuit 15 sets the DC level on the line and also sets the AC impedance of the telephone. The circuit 15 is connected to the handset 4 and includes a diode bridge (not shown) for polarity independence and also provides side tone cancellation.

The telephone controller is a 4-bit microprocessor connected to a conventional hands free circuit 16 which is connected in turn to a loudspeaker 17 and microphone 18 which are operable when the telephone is operated in hands free mode. The hands free circuit 16 is also connected via a power and speech connection 16A to the circuit 15. The circuit 16 is a voice switched device containing all the necessary amplifiers, detectors and comparators to perform complete hands free operation of the telephone in the conventional way. As can be seen, the telephone controller 13 is also connected to the display 5 and the key pad 3.

External power at 5V is supplied via a power supply port 19 and via a DC-DC convertor 20 at 5V to the telephone controller 13 and at 15V to one of the inputs of the relay 14.

The telephone set also includes a main controller 21 comprising a 16-bit application specific modem controller having a ROM of 128K and a RAM of 32K. The main controller is powered from the external power supply port 19 and is connected to the telephone controller 13 via optoelectronic isolation devices 22.

The main controller 21 is connected to a fax/modem digital signal processor 23 which in turn is connected to a fax/modem front end circuit 24 having analogue-to-digital conversion circuits 25. The circuits 25 are connected to the telephone port 2 via an isolation transformer 26 and a relay 27 (and the relay 14). Each of the circuits 23,24 is powered from the external power supply port 19.

The chip 24 provides all the analogue functions required for either a 300–2400 data modem or a group 3 fax. All analogue signals received are passed over a serial digital link to the DSP 23. Voice messaging is supported with a 12-bit DAC and ADC 25. Voice transmit and receive rates possible are 11000, 96000, 8000 and 7307 s/s. 12-bit linear samples in both directions provide high quality audio.

Operation of the relays 14,27 is controlled by the main controller 21 which sends control signals on a lines 28A, 28B. Each of the relays 14,27 has internal electrical isolation shown schematically by boxes 14',27'.

The main controller 21 can also determine calling line identity by virtue of a connection between a CLI impedance 29 connected between the relay 27 and isolation transformer 26, the impedance being connected to the main controller via an opto-electronic device 30.

The telephone set can operate in two modes. In mode 1, the main controller 21 is powered down and the telephone controller 13 operates all the telephone circuits. In mode 2 external power is supplied to the main controller 21 (and circuits 23,24 and 31), the telephone set may be connected to a PC via the port 7 and a serial interface 31 and the telephone controller 13 will operate as the slave device to the main controller 21. The PC serial interface 31 connects to seven of the signals on a 9-way serial port from the PC. The serial interface converts the RS232 signals to TTL level signals for the main controller 21.

In mode 1, the telephone controller is powered directly from the telephone line. In this situation, relay 14 is closed (not shown) and relay 27 is open (as shown) and the telephone network is connected to the line interface and speech circuit 15 and telephone controller 13. The telephone controller 13 can carry out various tasks including the following:

1. Operate the main line switch to allow the telephone to go off hook.
2. Detect if external power is available. If external power is available then the main controller is the master (mode 2).
3. Detect ringing and send indication of ringing to the main controller if connected.
4. Sound ringer on the telephone.
5. Control hands free circuit 16 (under instructions from main controller in mode 2).
6. Mute transmission to the line if required.
7. Scan the key pad 3 and relay key depressions to the main controller 21 (mode 2) or act upon it (mode 1).
8. Store a small number of speed dial numbers. These will be maintained via bleed from the line but will be lost as soon as the telephone is unplugged.
9. Dial tone detection.

10. Volume control of the speaker and ringer.
11. DTMF generation.
12. Modem loop circuit control.

In mode 1, the user can dial calls using the keypad 3 in a conventional manner and operate the telephone in hands free mode.

When the telephone line is released, the telephone controller 13 is adapted to be placed in power saving mode, i.e. when the handset 4 is replaced during handset mode or the release button is pressed during hands free mode. The power saving mode will be exited if a hook switch (not shown) is changed to the off hook position (for example by the handset 4 being lifted), a key is pressed on the key pad 3, ringing is detected at the port 2, or "wake up" has been received from the main controller 21.

The telephone set determines whether to operate in mode 1 or mode 2 as follows. Initially, the telephone controller senses whether or not it is receiving power from the external power supply port 19. If it is not, then it assumes that it should be operating in mode I and takes control of operation of the telephone set. If it is receiving power, then the telephone controller 13 will pass data which it receives to the main controller 21. If the telephone controller 13 receives commands from the main controller 21 within a predetermined period, it will assume that mode 2 operation should continue. Otherwise, it will revert to mode 1 operation. The main controller 21 in turn will attempt to pass data out through the port 7 on the assumption that a PC 8 is connected. If the main controller 21 does not detect a response from the PC 8 then it will take over control within mode 2 but otherwise will respond to instructions from the PC 8.

The remainder of the description will describe operation in mode 2. In mode 2, the main controller 21 comes into operation. In mode 2, the main controller can receive telephone set control signals from a PC connected to the port 7 and sends these via the opto-electronic device 22 to the telephone controller 13 which responds to them in exactly the same way as if they were sent from the key pad 3. In addition, the main controller controls operation of the fax/modem interface defined by the two circuits (chips) 23,24, communication with the PC via the port 7 and interface 31, and operation of the relays 14,27, and CLI via the impedance 29.

The fax/modem interface is, as shown, a two chip set solution performed by the DSP 23 and the front end 24. The DSP 23 performs all the processing required on the digital signals supplied by the main controller 21 before they are passed to the D/A circuits 25 on the front end 24 for transmission. For an incoming fax, this is received via the A/D circuits 25 and the front end 24 and then passed in digital form to the DSP 23 for processing in a conventional manner following which the fax data is supplied to the main controller 21 which will forward it on to the PC for storage.

The DSP 23 also performs a conventional speech compression algorithm on incoming speech. In this case, the speech is processed by a modem on the front end chip 24 and passed to the DSP 23 which performs the algorithm. This processing will be based on various processing parameters such as sampling time, compression ratio and the like which is supplied initially from the main controller 21 and thereafter stored within the DSP 23. The compressed speech is then fed via the main controller 21 to the processor 8 for storage. In addition, if appropriate, the parameters used for the compression are also stored on the processor 8. In reverse, compressed speech from the processor 8 may be supplied via the interface 31 and the main controller 21 to the DSP 23 where the speech is decompressed, converted to analogue, and fed out through the modem on the chip 24 to the telephone line.

As will be apparent from the above description, the telephone set can handle incoming and outgoing fax communications via the chips 23,24 as well as voice and data. The voice signals can be compressed for storage. For incoming calls, the telephone controller 13 answers the call and then determines the type of call as follows. If the incoming signal has a varying frequency it is taken to be a voice call, if a fax tone is detected, the call is taken to be a fax, and if anything else is detected, a modem call is assumed.

The voice or speech compression enables various additional functions to be performed when the telephone set is in mode 2. For example, an answer machine capability can be set up. Initially, the main controller 21 operates a suitable answer machine set up routine requiring the user to speak into the handset 4 or microphone 18 with his message. In this routine, the relay 14 is moved to its open position (shown) to provide power, while the relay 27 is closed. The speech will be compressed by the algorithm in the DSP 23 and stored on the processor 8. Subsequently, when a call is incoming and the telephone set is set to respond as an answer machine (for example after a predetermined number of rings have been detected by the telephone controller 13 and the telephone has not been answered), the processor will be caused to pass the stored speech to the DSP 23 where it will be decompressed, fed to the chip 24 and then out onto the line 2 with relays 14,27 in their closed positions. In response, the caller can then record a message by speaking into his telephone, the transmitted speech being digitised in the circuits 25, compressed by the DSP 23 and then stored on the processor. The telephone set can also be used in a similar way to a dictation machine. In this case, the relay 14 is opened so as to be connected to the power supply port C whereby power is supplied to the circuits 15,16. The relay 27 closed, and the user simply speaks into his handset 4 or microphone 18 and the speech he wishes to record. The speech will be passed via the telephone controller to the DSP 23 and then to the processor 8 for storage.

In a typical operation in mode 2 with external power supplied, when an incoming call is received by the telephone set 1, the telephone controller 13 will cause a ringing sound to be emitted by a ringer (not shown) and at the same time will pass suitable signals to the main controller 21 which will pass appropriate signals to the PC 8 to cause an icon to flash on the screen 9. In order to answer the call, the user operates the mouse 11 to move a cursor to the flashing icon and clicks on the icon. This causes the PC 8 to generate a code which is transmitted to the serial port 7 and to the main controller 21 which causes the telephone controller 13 to activate the circuit 16 so the telephone set enters hands free mode. The call is thus answered and the user can converse via the microphone 18 and speaker 17 with the caller.

In a second mode of operation (within mode 2) in which the user wishes to make a call, he causes the PC 8 to display a directory of stored telephone numbers on the screen 9 and makes an appropriate selection. He then selects with the mouse 11 a "dial now" option from a menu and the PC 8 then sends the telephone number to be dialled via the serial port 7 to the controller 21. The controller 21 causes appropriate signals to be supplied to the telephone controller 13 which causes corresponding DTMF tones to be generated to the PSTN. When the call is answered, the telephone set 1 will automatically be in hands free mode.

It will be appreciated that other options can be controlled from the PC 8. For example, if the volume from the speaker 17 can be varied, this could be achieved from the PC 8.

If a fax message is to be sent which has been prepared on the PC 8, the user will call up a directory as before and select a suitable fax destination by using the mouse 11. The user then initiates transmission by selecting the appropriate option and the PC 8 sends control data through the serial link 7 to the controller 21. This control information will also include data indicating that it is a fax type call which is to be made. The controller 21 causes the call to be made using the DSP 23 and front end 24 and monitors for the call to be answered. When the call is answered, the controller 21 controls the front end 24 to transmit the fax which is supplied through the port 7. In some cases, the controller 21 could activate a light (not shown) on the telephone set to indicate that it is in use during a fax transmission.

It will also be appreciated that the telephone set 1 can be operated in a conventional manner by using the key pad 3 and function keys 6. Thus a fax destination could be dialled from the keypad 3 although the fax is supplied from the PC 8.

An important aspect of the construction of the telephone set is the manner in which it is isolated from the telephone network. It will be noted in particular that the main controller 21, DSP 23, front end chip 24, and serial interface 31 are completely isolated electrically from the rest of the telephone circuits and the line. This is achieved by the transformer 26 and the opto-electronic devices 22,30 and isolation within the relays 14,27.

Figure 3:
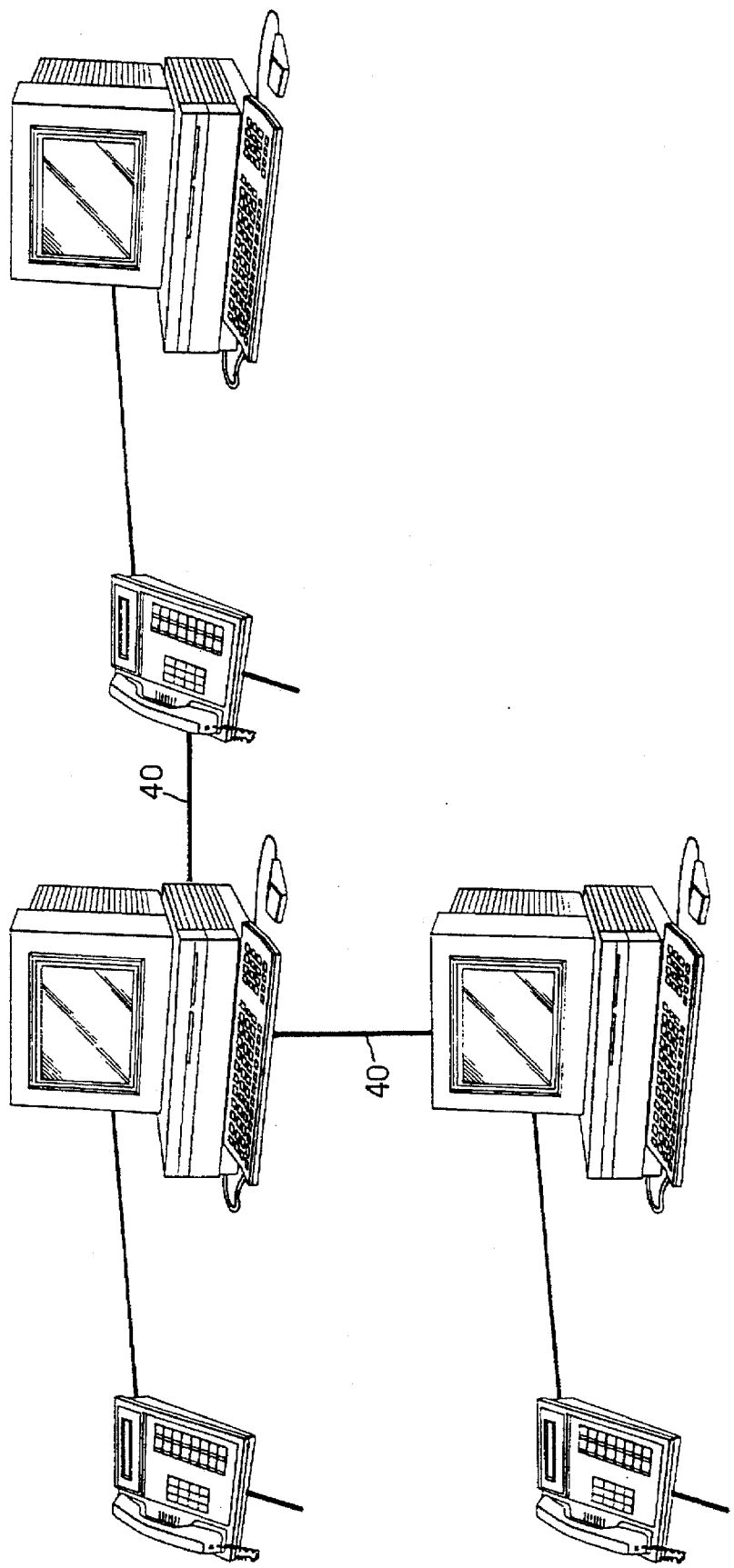

FIG. 3 illustrates an enhanced system in which a number of sets of apparatus of the form shown in FIG. 1 are linked together by a local area network 40 such as a Token Ring. This opens up a number of additional operational functions including the ability to access speech recorded in one PC 8 from a telephone set 1 connected to another PC. For example, an incoming caller could record speech on the PC associated with the dialled telephone and then a secretary could access that speech from her own telephone set and PC.

It will be appreciated that may different functions and combinations of functions can be achieved.

We claim:

1. A telephone set having
   an analogue telephone port for connection to an analogue telephone network,
   first control means responsive to input signals for generating routing control signals at the telephone port compatible with the telephone network and for controlling operation of the telephone set,
   input means connected to said first control means for providing a first set of input signals,
   second control means for providing special telephone functions and for controlling the first control means, said second control means further comprising speech processing means for processing speech signals received from the telephone network into a form suitable for digital storage,
   a power supply port connected to said first and second control means and adapted for connection to a power source independent of the telephone network,
   a serial interface for connecting said second control means to an external processor, whereby said first control means is responsive to said first set of input signals from said input means or a second set of input signals produced by said second control means in response to signals supplied via said serial interface, said first and second set of input signals controlling to operation of said telephone set,
   and means for electrically isolating the telephone network from each of said serial interface and said power supply port while permitting data transfer between the telephone network, said second control means and said external processor.

2. A telephone set according to claim 1, wherein said first control means comprises a telephone controller connected to said analogue telephone port, said telephone controller responding to said first set of input signals to carry out normal telephone set operations.

3. A telephone set according to claim 2, wherein said telephone controller is electrically isolated from the remainder of said control means.

4. A telephone set according to claim 1, wherein said input means is manually operable to enable a user to manually generate said first set of input signals.

5. A telephone set according to claim 4, wherein said control means comprises a telephone controller connected to said analogue telephone port, said telephone controller responding to input signals to carry out normal telephone set operations, and wherein said input means is connected directly to said telephone controller, said telephone controller being operable in response to power derived solely from the telephone network when responding to input signals from said input means.

6. A telephone set according to claim 1, wherein said isolating means includes at least one of an opto-electronic isolator and an isolating transformer.

7. A telephone set according to claim 1, wherein said speech processing means performs a compression algorithm on the speech signals.

8. A telephone set according to claim 1, wherein said control means includes a fax processing means connected to said analogue telephone port for transmitting and receiving fax data.

9. A telephone set according to claim 1, wherein said control means includes a data modem connected to said analogue telephone port for transmitting and receiving data defining signals.

10. Telephone apparatus comprising:
    a telephone set having an analogue telephone port for connection to an analogue telephone network,
    control means for generating routing control signals at the telephone port compatible with the telephone network and being responsive to input signals to control operation of the telephone set, said control means further comprising means for processing speech signals received from the telephone network into a form suitable for digital storage,
    a power supply port connected to said control means and adapted for connection to a power source independent of the telephone network,
    input means connected to said control means for supplying first input signals to said control means,
    a serial interface for connecting said control means to separate devices, whereby said control means is responsive to said first input signals from said input means and second input signals supplied via said serial interface to control operation of said telephone set,
    means for electrically isolating the telephone network from each of said serial interface and said power supply port while permitting data transfer between the telephone network and said control means;
    and a separate processor connected to said telephone set via said serial interface, said processor being adapted to generate said second input signals for controlling operation of said control means.

11. Apparatus according to claim 10, wherein said input means is manually operable to enable a user to manually generate input signals and wherein the separate processor is adapted to generate all possible input signals which can also be generated by the manual input means.

12. Apparatus according to claim 10, wherein said separate processor further comprises storage means for storing speech signals which have been processed by said speech processing means.

13. A communication network comprising:
at least two sets of telephone apparatus, each telephone apparatus comprising:
- a telephone set having an analogue telephone port for connection to an analogue telephone network,
- control means for generating routing control signals at the telephone port compatible with the telephone network and being responsive to input signals to control operation of the telephone set,
- a power supply port connected to said control means and adapted for connection to a power source independent of the telephone network,
- input means connected to said control means for supplying first input signals to said control means, a serial interface for connecting said control means to external devices, whereby said control means is responsive to said first input signals from said input means and second input signals supplied via said serial interface to control operation of said telephone set,
- means for electrically isolating the telephone network from each of said serial interface and said power supply port while permitting data transfer between the telephone network and said control means; and
- a separate processor connected to said telephone set via said serial interface, said processor being adapted to generate said second input signals for controlling operation of said control means, and communication means for connecting said processors of said apparatus together for communication therebetween.

* * * * *